Patented Dec. 15, 1953

2,662,823

UNITED STATES PATENT OFFICE 2,662,823

METHOD OF SOUP CANNING

Harold F. Snow, Pine Point, Maine, assignor to The F. H. Snow Canning Company, Inc., Pine Point, Maine, a corporation of Maine No Drawing. Application July 26, 1950, Serial No. 176,069

5 Claims. (Cl. 99—186)

My present invention relates to methods of producing hermetically sealed, heat sterilized packages of soup from split dry seeds such as beans, and lentils.

It has long been the practice to produce such a soup by preparing and cooking a relatively large volume thereof and then canning the cooked soup in containers in a conventional manner. This procedure is objectionable primarily because the products have a characterized overcooked flavor. In normal home cookery, the housewife when preparing a soup from seeds as mentioned above, cooks the seeds in a relatively large volume of water allowing the mass to simmer or boil for a period of about two and one-half hours, after which time the seeds, having swelled and cooked, are dispersed in whole or in part through the liquid medium thus changing the texture from a water-thin liquid having solids staying in the bottom of the container, to a relatively thick puree, which may or may not have some of the cooked seeds remaining undispersed. The product of such cooking is recognized as a soup.

In normal production practice of pea, bean, and lentil soup canning, the soup is prepared generally as the housewife prepares it, after which time the soup is placed in containers which are hermetically sealed. Heat is then applied in an amount sufficient to properly sterilize the contents commensurate with ordinary canning practice. The sum total of the heat exposure in such an operation is excessive, inasmuch as virtually all of the heat exposure following the filling operations, is over and above that required to produce the original soup. Such additional heat exposure tends to reduce the quality of the final product, particularly from a flavor standpoint.

The primary objective of this invention is to provide soups that may be produced on an efficient and economical basis and that have the superior flavor characterized by being virtually free of an overcooked taste, by using a process in which the products' exposure to heat is markedly less and any cooking prior to the sealing of the can is eliminated. In such a case only sufficient heat exposure as is needed to produce a sterile, hermetically sealed pack is used.

In accordance with my invention I provide a process of making soups from dried seeds such as peas, beans, and lentils, which comprises the placing of a determined weight of such seed in split form in a container with a given weight of water containing seasonings, flavorings, or both, in solution or in suspension, with or without the addition of fats or oils, and finely cut vegetables. After the container is sealed, it is exposed to heat for a time and at a temperature to effect the swelling and cooking of the split seeds and the sterilization of the contents of the container to an extent consistent with normal practice.

In the case of the soup canning process as herein outlined, the quantity of heat exposure following the sealing of the can is markedly less than even the heat exposure required after the sealing of the container when the conventional soup packing process is used. This reduction of heat exposure is due to the fact that in my process the contents of the can are in two distinct phases. One phase is the solid phase which comprises a granular agglomeration of seeds, in which case at the outset of the heat exposure this agglomerate comprises hard dry particles which progressively absorb water, swell to a volume of about two and one-half times the original volume, then cook in the normal sense to an agglomerate of swelled, cooked seeds which, though soft, still have a structure symmetrical to that of the original split seed. If desired, the split seed particles may be pre-soaked.

The second phase comprises a limpid liquid having seasonings, flavorings, or both, and possibly oils, in solution and suspension. Throughout the heat exposure process this liquid phase has a fluidity very nearly as high as that of pure water despite the fact that a very small amount of starch is dispersed into the liquid phase from the seeds, as the heat exposure process progresses.

In the event that pieces of vegetable are added to the soup prior to the sealing of the container, then naturally these would comprise part of the solid phase and hence not affect the principle involved. During such a heat exposure process, in which the liquid phase has a high degree of fluidity, convection forces are free to take place to an excellent degree, allowing a relatively high rate of heat transfer throughout the mass of the contents of the container, and since the solid phase is porous in that there are a large number of interstices through the solid phase, convection likewise takes place throughout the crevices of the solid phase. Thus, this process affords an excellent heat transfer condition.

In the case of conventional packing of soups from seeds such as above mentioned, the container is filled with a mass which is obviously already a soup. In the heat exposure subsequent to the sealing process a heat effect, sufficient to effect proper sterilization, must be administered. Since throughout this heating process the mass of the can has considerable viscosity, convection movements are markedly less than in the new process which I describe, with the result that under given like conditions of container size and shape, degree of container fullness, and fill-in temperature, proper sterilization under my process is effected in a considerably shorter time. Thus, when comparing the sum total heat exposure with that in the conventional process with the heat exposure required in my process, it is obvious that a tremendous difference is realized because not only does my process eliminate a pre-heat exposure of several hours but it also eliminates a considerable amount of the heat exposure subsequent to the container sealing operation. A product of superior volume is thereby produced.

At the end of the heat exposure, if a container is opened, it is noticed that the contents would not in appearance or texture be considered a soup. It would have more nearly the appearance of a pack of whole kernel corn, in which case the limpid phase is virtually a water-thin serum and the solid phase is in a state in which the individual particles, while retaining their form, are soft and fragile. To change the mass into a soup it is necessary merely to agitate the package. In the agitation process, the fragile pea, bean, or lentil solids are dispersed throughout the liquid phase. The amount of dispersion may be controlled so as to result in a soup having any desired amount of undispersed bean, pea, or lentil particles, or may be agitated so as to completely puree the contents of the container depending on consumer preference, except when pieces of vegetables were included in the contents of the container, in which case they would not be disintegrated by agitation.

As, following the heat exposure process, the package is cooled, the fragility of the bean, pea, or lentil particles decreases. Therefore, it is obvious that the amount of agitation required to produce a certain degree of pureeing of the solids, must be increased as the temperature of the mass during the agitation process is decreased. Although with very violent agitation satisfactory pureeing may be realized when the agitation is done at room temperature or below, there are definite advantages in performing the agitation process at an elevated temperature, as between the temperature at which the contents were sterilized, say, 250° F. and 100° F., first because the agitation process is then more easily carried out, and secondly, because by agitating at an elevated temperature, the starch grains, having been partially dispersed into the liquid phase, are affected by the heat causing some of the starch grains to burst thereby releasing a certain amount of colloidal starch having a considerable amount of gelation characteristics, giving a superior creamy texture to the final product. When the agitation process is carried out at temperatures at, or about room temperature, a markedly less amount of the above type of starch is produced. Therefore the agitation process is preferably carried out while the containers are still hot.

Thus, from the foregoing considerations, it is important to note that, in accordance with my invention, all processes prior to the agitation process are primarily steps to the actual making of the soup, and soup in the strictest sense is produced after the heat exposure process in the agitation step.

Another advantage is realized under my process. In the conventional packaging of soups made from dry seeds, such as above mentioned, it is usually desirable from a consumer's standpoint to have a certain amount of solids remain not pureed, in the soup. In a commercial process, it is thus necessary to prepare a relatively large volume of the soup, placing portions of the above in a multiplicity of small containers. In practise, it is virtually impossible to effect accurate control of the solids contents so as to assure the same amount in each container as they are filled. My process has an advantage in that into each container is placed a definite amount of solids whether dry or pre-soaked, which is easily maintained at a uniform level through the use of modern dispensing machines.

In considering my invention in more detail, the ratio between the weight of raw split seeds, and the weight of the liquid phase in each container is subject to some variation between such satisfactory limits as from 1–7 to 1–4 and depending on whether the seed particles are dry or have been pre-soaked. It is one of the attributes of my invention that the heat process time of soups made in accordance with my method may be reduced, and, in practise, the time utilized is consistent with that employed to sterilize sealed containers. In practise, I employ a cooking temperature in the area of 250° F. and the cooking time is usually from 25 to 35 minutes in a container of approximately one pound capacity but equivalent combinations of time and temperature may of course be employed. While the cooking time is obviously related to temperature, which may be varied between the approximate limits of 230° to 260° F., and container size, it is important that the procedure followed causes the seeds to be swollen and cooked at the end of the sterilization step, thereby to be so softened that during the subsequent agitation step, the cooked seed masses are easily dispersed. To accomplish this the seeds must be split, for otherwise the seed hulls, being unbroken, capsulate the contents, preventing adequate liquid absorption and preventing proper dispersion of the seed center masses during the agitation process. In practise I effect agitation by any suitable means, when the cooked contents of the sealed containers is close to the sterilizing temperature.

From the foregoing, it will be appreciated that, in accordance with my invention, the particles of the solid phase are placed in the containers to establish optimum heat transfer conditions and that heat exposure prior to sterilization is eliminated. For those reasons, a superior product results with attendant economy in production. At the same time, the step of content agitation insures that soup made in accordance with my invention may be produced with the cooked particles uniformly dispersed therethrough to the desired extent.

What I therefore claim and desire to secure by Letters Patent is:

1. The process of making a soup from such dried seeds as peas, beans, and lentils that comprises placing in a container, a predetermined weight of such seeds in split form and in a raw state and a predetermined weight of water and at least one ingredient from a group including fats, oils, seasonings, and flavorings, sealing the container, and subjecting the contents of the container to a temperature and for a time related thereto to sterilize said contents and to cook the seeds until they are soft and fragile but retain their form thereby to maintain the efficiency of the water as a heat exchanging medium substantially unimpaired, subsequently agitating said contents to effect at least a partial break up of the cooked seeds and the dispersion of such broken up seeds to complete the soup.

2. The process of claim 1 and the step of soaking the seed particles to cause them to swell before placing them in the container.

3. The process of making a soup from such dried seeds as peas, beans, and lentils that comprises placing in a container, a predetermined weight of such seeds in split form and in a raw state and a predetermined weight of water and at least one ingredient from a group including fats, oils, seasonings, and flavorings, sealing the container, subjecting the contents of the container to a temperature and for a time related thereto to sterilize said contents and to cook the seeds until they are soft and fragile but retain their form and without effecting any material change in the consistency of the liquid contents of the container thereby to maintain the efficiency of the water as a heat exchanging medium substantially unimpaired, and then agitating the contents of the container to complete the soup by breaking the cooked seeds apart to the desired extent and dispersing the particles through the water.

4. The process of making a soup from such dried seeds as peas, beans, and lentils that comprises placing in a container, a predetermined weight of such seeds in split form and in a raw state and a predetermined weight of water and at least one ingredient from a group including fats, oils, seasonings, and flavorings, sealing the container, subjecting the contents of the container to a temperature and for a time related thereto to sterilize said contents and to cook the seeds and then agitating the contents while hot to break up the seeds and disperse them in the water.

5. The process of claim 4 in which the agitating step is carried out while the temperature of the contents is between 100° F. and 250° F.

HAROLD F. SNOW.

References Cited in the file of this patent

UNITED STATES PATENTS

| Number | Name | Date |
|---|---|---|
| 1,634,332 | McGowan | July 5, 1927 |
| 2,127,782 | McShane | Aug. 23, 1938 |
| 2,232,282 | Struble | Feb. 18, 1941 |

OTHER REFERENCES

"A Complete Course in Canning," published by The Canning Trade, 1924, page 311.